3,353,861
DRIVER'S CAB WITH AT LEAST ONE BUNK
Hans Froitzheim and Karl Letzel, Sindelfingen, Wurttemberg, Germany, assignors to Daimler-Benz Aktiengesellschaft, Stuttgart-Unterturkheim, Germany
Filed July 15, 1965, Ser. No. 472,114
Claims priority, application Germany, July 17, 1964, D 44,966
6 Claims. (Cl. 296—24)

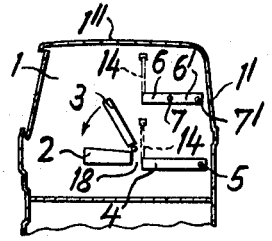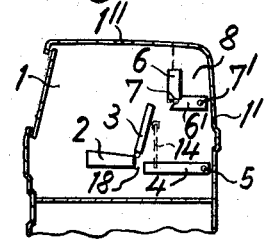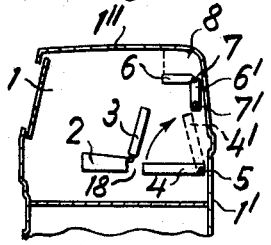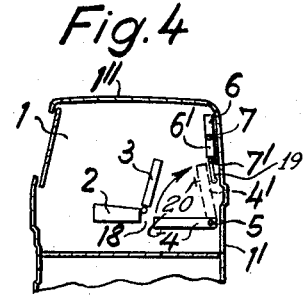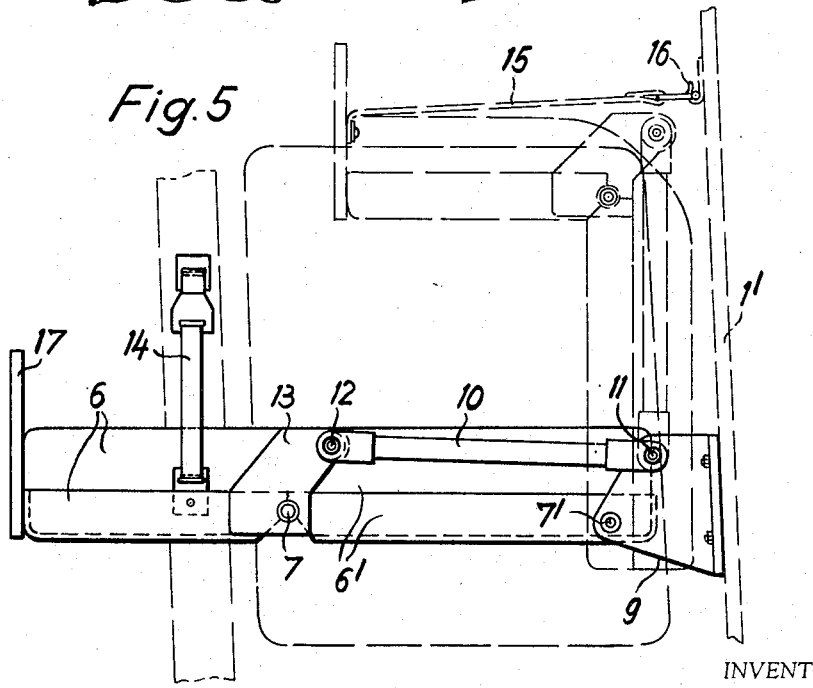

ABSTRACT OF THE DISCLOSURE

Improvements in the driver's cab of a motor vehicle, especially of a truck or bus or tractor of a semi-trailer unit, including the provision of at least one bunk or berth for the driver, the bunk being located behind the driver's seat at a height approximately corresponding to the upper edge of the back rest of the driver's seat, said bunk extending transversely to the longitudinal direction of the vehicle and being divided transversely to form a front part and a rear part, the front part being pivotally connected to the rear part, the pivotal connection being adapted to lock the front part in various angular positions with respect to the rear part, the rear part being pivotally connected to the rear wall of the driver's cab; additionally, the provision in combination with the aforementioned bunk, of a second bunk positioned below the first bunk and pivotally connected to the rear wall of the driver's cab.

---

The present invention relates to improvements in the driver's cab of a motor vehicle and especially of a truck or bus or a tractor of a semi-trailer unit, and more particularly it relates to improvements in the accommodations for the driver and/or his assistant or relief driver in the form of at least one berth or bunk within the driver's cab.

It is an object of the present invention to provide the driver's cab of such a vehicle with at least one bunk which is located behind the driver's seat substantially at the level of the upper edge of the back rest of this seat and extends transversely to the longitudinal direction of the vehicle.

Another object of the invention is to design such an upper bunk in a manner so as to permit it to be converted into a baggage compartment which is located above and behind the driver's seat and does not interfere with the driver's position or with his movements in operating the vehicle. This baggage compartment is primarily intended for holding the bedding for this upper bunk as well as for a lower bunk, if provided.

In order to permit this upper bunk to be used either as a berth for one of the driver's or as a baggage compartment, the invention provides that this bunk be divided transversely thereof into two parts which are pivotably connected to each other so that the front part may be adjusted to different angles relative to the rear part and may be locked in the different positions. More specifically, it is a feature of the invention to provide suitable means which permit the front part of this upper bunk to be pivoted either upwardly or downwardly so as to extend substantially at a right angle to the rear part and which also permit the rear part itself to be pivoted upwardly against the rear wall of the cab, and to provide suitable means for securely locking both parts of the bunk in the positions to which they have been adjusted.

Another object of the invention is to provide a lower bunk behind the driver's seat and likewise extending transversely to the longitudinal direction of the vehicle. In order to permit an easy access to equipment which might be deposited on the floorboards behind the driver's seat or to permit these floorboards to be removed so as to gain access to a compartment underneath them, for example, to the engine compartment of a truck in which the cab is mounted over the engine, the invention further provides this lower bunk to be pivoted upwardly against the rear wall of the cab. For the last-mentioned purpose and also in order to provide more room for ventilation around the lower bunk when the same is being used for sleeping, it is advisable that the front seat or seats be adjustable in the usual manner in the longitudinal direction of the cab and that their back rests be pivotable forwardly.

These as well as additional features and advantages of the present invention will become more clearly apparent from the following detailed description thereof which is to be read with reference to the accompanying drawings, in which:

FIGURES 1 to 4 show diagrammatically the different operational positions of the driver's seat and two bunks in the driver's cab of a motor vehicle; while FIGURE 5 shows a side view of the upper bunk in its two different positions according to FIGURES 1 and 3 but on a larger scale.

As illustrated in the drawings, the driver's cab 1 contains a driver's seat 2 which is adjustable to different positions in the longitudinal direction of the cab and has a forwardly pivotable back rest 3. Behind and approximately at the level of the driver's seat 2 a one-piece bunk 4 is provided which extends transversely to the longitudinal direction of the cab and may be pivoted upwardly against the back wall 1' of the cab about a set of hinges 5.

Above the lower bunk 4 and approximately at the level of the upper edge of the back rest of the driver's seat 2 an upper bunk 6, 6' is provided which according to the invention is divided approximately centrally of its width. The front part 6 of this bunk is pivotably connected at 7 to the rear part 6' so as to permit this front part 6 to be pivoted upwardly and/or downwardly about an angle of 90° relative to the rear part 6'. Suitable means are provided for locking the two parts 6 and 6' to each other in the horizontal position and in either of the angular positions. These adjusting and locking means may be of any desired type, for example, similar to those as used on reclining chairs or on the front seats of cars for adjusting the back rests thereof to different inclined positions. In addition, the bunks may be secured in their horizontal positions or in their upwardly pivoted positions by holding straps 14 and 15 or suitable locking means which are mounted on the walls of the cab. The upper bunk may also be provided with control rods which, when this bunk is pivoted upwardly from the horizontal position, automatically pivots the front part 6 thereof to the desired angular position.

The manner of operation of the berths according to the invention is as follows:

FIGURE 1 illustrates the bunks 4 and 6, 6' in their horizontal or sleeping positions so that both drivers may lie down. The back rest 3 of the front seat or seats is then pivoted forwardly. FIGURE 2 shows the seats and bunks in one of the positions to which they may be adjusted while the truck or the like is being driven. The driver then occupies the driver's seat 2, 3 in its normal position, while the relief driver may lie on the lower bunk 4. When this bunk is not occupied, it may either remain in its horizontal position or be pivoted upwardly against the rear wall 1' of the cab to the position 4' as shown in dotted lines in FIGURES 3 and 4. In order to protect one or both drivers from hitting their heads against the upper bunk, the front part 6 thereof may be pivoted upwardly to the position as shown in FIGURE 2. In this position, the front part 6 forms the front wall of a baggage compartment 8 which is enclosed by the two parts 6 and 6', the top 1" of the cab and the upper part of its rear wall 1'. This compartment 8 may be used especially for storing the bedding for one or both bunks.

A similar baggage compartment 8 may be formed by pivoting the rear part 6' of the upper bunk upwardly against the rear wall 1' of the cab and the front part 6 downwardly or forwardly to the position as shown in FIGURE 3. If such a baggage compartment is not desired or should be temporarily removed, for example, for the purpose of enabling one or both drivers to carry out some kind of work on or underneath the top wall of the cab, the entire upper bunk may also be pivoted upwardly against the rear wall 1' of the cab, as illustrated in FIGURE 4.

FIGURE 5 illustrates in greater detail one particular manner in which the upper bunk may be pivoted from the position according to FIGURE 1 to the position according to FIGURE 3. It consists of the two upholstered parts 6 and 6' which are pivotably connected to each other by hinges 7. In addition, the rear part 6' of this bunk is pivotably connected at both sides thereof to a pair of brackets 9 which are secured to the rear wall 1' of the cab. Each of these brackets 9 also carries an arm 10 which is pivotably connected thereto at 11, while its other end is pivotably connected at 12 to a bracket 13 which is secured to the rear end of the front part 6 of the bunk. The two arms 10 are made of such a length and their pivot points 11 and 12 are located in such positions that, when the rear part 6' of the bunk is pivoted upwardly toward the rear wall 1' of the cab, these arms 10 will at the same time swing the front part 6 of the bunk forwardly to the position as indicated in FIGURE 5 in dot-and-dash lines. For securing the bunk in its horizontal position, as shown in full lines, a pair of straps 14 may be hooked upon the side walls or the top of the cab, while in its upwardly pivoted position the bunk may be secured by straps 15 to hooks 16 which are provided on the rear wall 1' of the cab. For protecting the sleeper from falling out of his bunk, the free side of the front part 6 facing the driver's seat may be provided with a guard board 17. This board will also serve as a front wall when the bunk is pivoted upwardly to the position as shown in FIGURE 3 and serves as a baggage compartment 8.

In order to provide the person sleeping in the lower bunk 4 with sufficient ventilation when the back rest 3 of the seat or seats is in its normal position, the front side of this bunk is spaced from the driver's seat 2 so as to form a gap 18 of a sufficient width so that the air may freely circulate therethrough.

Each of the bunks may be provided either with a continuous mattress or with one which is divided into several cushions and it may either lie loosely on the bunk frame or be removably secured thereto so as not to fall out of the frame when the bunk is pivoted upwardly. The rear hinges 7' of the upper bunk may also be designed so as to serve as latches or the like for holding the front edge of the lower bunk 4 when the latter is pivoted upwardly. For example, retaining straps 19 may be employed, which are secured at their upper end to brackets 9 and which are adapted to be releasably secured to appropriately positioned projections 20 on the underside of lower bunk 4.

Although our invention has been illustrated and described with reference to the preferred embodiments thereof, we wish to have it understood that it is in no way limited to the details of such embodiments but is capable of numerous modifications within the scope of the appended claims.

Having thus fully disclosed our invention, what we claim is:

1. In a driver's cab of a motor vehicle, the improvement comprising an upper bunk within and extending transversely to the longitudinal direction of said cab and located behind the back rest of the driver's seat and normally at a height approximately corresponding to the upper edge of said back rest, said bunk being divided transversely thereof, thus forming a front part and a rear part, connecting means for pivotably connecting said front part to said rear part, said connecting means including means for locking said front part in different angular positions with respect to said rear part, means for permitting at least said rear part of said upper bunk to be pivoted upwardly from a horizontal position to a substantially vertical position adjacent to the rear wall of said driver's cab, means for locking said rear part at least in said substantially vertical position, said means for locking said front part with respect to said rear part adapted to lock said front part in a position at right angles to said rear part when said rear part is pivoted to said substantially vertical position.

2. The combination according to claim 1, wherein said rear part of said upper bunk is positioned substantially horizontally and said front part of said upper bunk is positioned at right angles thereto, extending substantially vertically above said rear part, whereby said front part and said rear part of said upper bunk, in combination with the rear wall of said driver's cab, define therebetween a storage compartment.

3. A combination as defined in claim 1, in which at least said driver's seat is adjustable to different positions in a substantially horizontal direction and the back rest of said seat is adapted to be pivoted forwardly.

4. A combination as defined in claim 1, further comprising a lower bunk underneath said upper bunk and also extending transversely to the longitudinal direction of the cab and normally located behind and substantially at the level of said driver's seat, and means for permitting said lower bunk to be pivoted about an axis adjacent and substantially parallel to its rear side from a horizontal position to a substantially vertical position adjacent to the rear wall of the cab, and means for locking said lower bunk at least in said vertical position.

5. In a driver's cab of a motor vehicle, the improvement comprising an upper bunk within and extending transversely to the longitudinal direction of said cab and located behind the back rest of the driver's seat and normally at a height approximately corresponding to the upper edge of said back rest, said bunk being divided transversely thereof, thus forming a front part and a rear part, connecting means for pivotably connecting said front part to said rear part, said connecting means including means for locking said front part in different angular positions with respect to said rear part, means for permitting at least said rear part of said upper bunk to be pivoted upwardly from a horizontal position to a substantially vertical position adjacent to the rear wall of said driver's cab, means for locking said rear part at least in said substantially vertical position, said means for locking said front part with respect to said rear part adapted to lock said front part in a position at right angles to said rear part when said rear part is pivoted to said substantially vertical position, further comprising lever means pivotably connecting said front part and said rear part of said upper bunk to each other in such a manner that, when said rear part is being pivoted upwardly to said substantially vertical position, said front part is pivoted by said lever means to said position at a substantially right angle to said rear part.

6. A combination as defined in claim 5, in which said locking means for locking said lower bunk in said vertical position are connected to said upper bunk.

References Cited
UNITED STATES PATENTS

| | | | |
|---|---|---|---|
| 1,716,316 | 6/1929 | Lanning | 296—65 |
| 3,246,347 | 4/1966 | Mason | 5—9 |

FOREIGN PATENTS 32,559   9/1955   Germany.

LEO FRIAGLIA, *Primary Examiner.*

BENJAMIN HERSH, *Examiner.*

P. GOODMAN, *Assistant Examiner.*